May 2, 1967 J. S. WRIGHT 3,317,151
PROJECTION STAGE APPARATUS
Filed July 19, 1963 3 Sheets-Sheet 1

INVENTOR.
JOHN S. WRIGHT
BY
Wheeler, Wheeler & Wheeler
ATTORNEYS

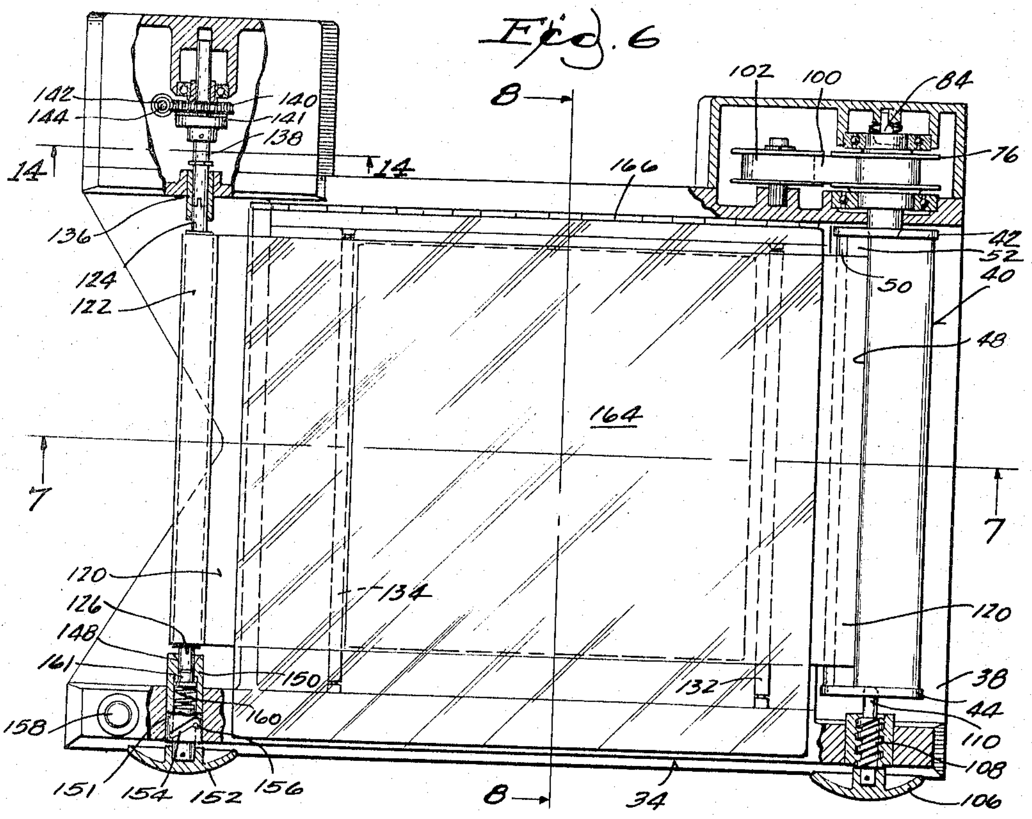
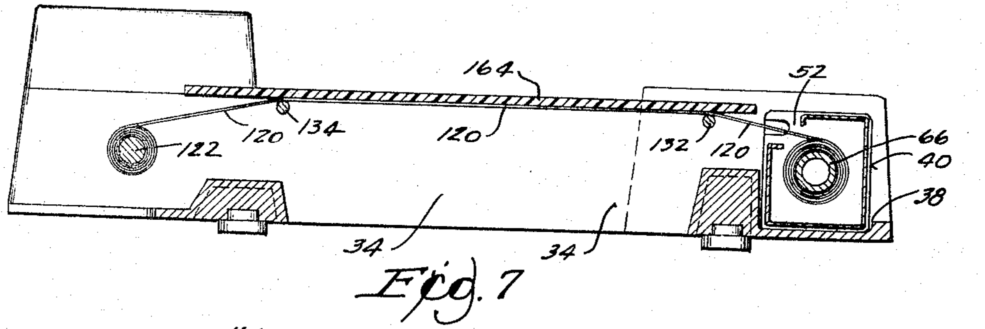
FIG. 7
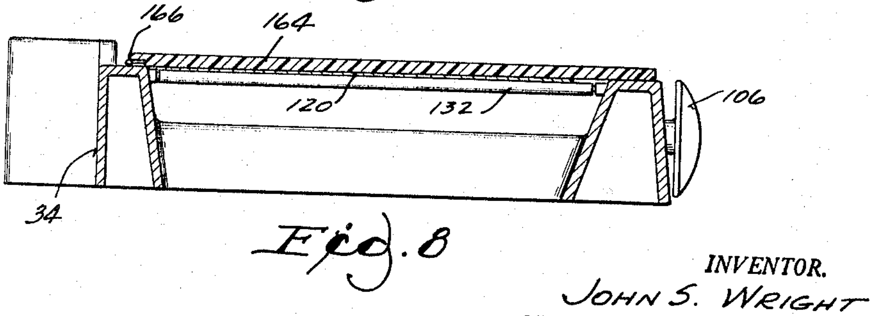
FIG. 8
INVENTOR.
JOHN S. WRIGHT
BY
Wheeler, Wheeler & Wheeler
ATTORNEYS

PROJECTION STAGE APPARATUS

Filed July 19, 1963

3 Sheets-Sheet 3

INVENTOR.
JOHN S. WRIGHT
BY
Wheeler, Wheeler & Wheeler
ATTORNEYS

United States Patent Office 3,317,151

Patented May 2, 1967

3,317,151

PROJECTION STAGE APPARATUS

John S. Wright, 627 Birch Ave., Whitefish Bay, Wis. 53217

Filed July 19, 1963, Ser. No. 296,322

10 Claims. (Cl. 242—55.12)

This invention relates to projection stage apparatus.

The preferred embodiment disclosed includes an ancillary stage specially designed for use on the existing stage of a conventional overhead projector. The invention is not concerned with the overhead projector as such. Neither is it broadly material whether the features disclosed are incorporated in ancillary equipment or built into, or used with, the permanent stages of known projectors, lightboxes, etc.

Included in apparatus embodying the present invention is a base or frame having a central window and provided at opposite sides thereof with motor-operated winding spindle and provision for a separable transparency film cartridge. The term "film" is used herein to describe any transparent web bearing photographic, or printed, or other images for projection. The base incorporates a negator motor which subjects to substantially constant torque a spool within the cartridge upon which is wound the film bearing the images to be projected. In order that all of the film may be rewound upon the cartridge spool when released from the motor-driven winding spool, a clutch is provided for maintaining a predetermined minimum torque on the negator motor. When the cartridge is inserted into the supplemental stage the spool therein is first clutched to the negator motor and then the brake which retains the minimum torque in the motor is released to impose such torque on the spool.

A push button may conveniently control the electric motor which drives the winding spool to advance successive images across the supplemental stage for individual projection. Each time the push button is released, the image then in registry with the stage will stop in projection position. After all desired projection has been effected, or the entire film has been wound on the motor-driven spool, the motor driven spool can be unclutched from the electric motor and thereupon the negator spring motor will rewind the film upon the spool of the cartridge.

In a preferred arrangement, the spindle of the winding spool remains permanently attached to the end of the film in the cartridge, the cartridge being provided with a pocket for the reception thereof.

An overhead projector is one in which the user faces his audience and has his material horizontally before him for projection onto a screen which is behind him and which is faced by the audience. An important feature of the present invention consists in the provision on the film of a strip of material on which notes are printed in a manner such that they are illuminated by the light of the projector to increase their legibility. Notwithstanding that sufficient light penetrates the relatively opaque background strip for illuminating the notes brilliantly, the material of the notes is not projected onto the screen. This is a very important factor to a lecturer, whose notes can be brilliantly visible to himself only and yet can be viewed by him concurrently with the image on the stage to which the notes relate.

In the preferred embodiments of the invention, the film is not a photographic transparency but is printed like any other color picture except that transparent inks are used. It is possible for the lecturer to use a grease pencil or the like directly on the film. In preferred embodiments of the invention, the film sheet is covered by a transparent sheet on which grease pencil markings are inscribed. This sheet is self-supporting to provide a rigid scribable surface. Either with a pointer or with the pencil he may designate portions of the projected picture to which he wishes to direct the particular attention of his audience. With the pencil he may modify the image for the purposes of his lecture.

In the drawings:

FIG. 6 is an enlarged plan view of an assembly of projection apparatus emobdying the invention, portions being broken away.

FIG. 7 is a view taken in section on the line 7—7 of FIG. 6.

FIG. 8 is a view taken in section on the line 8—8 of FIG. 6.

Figure 1:
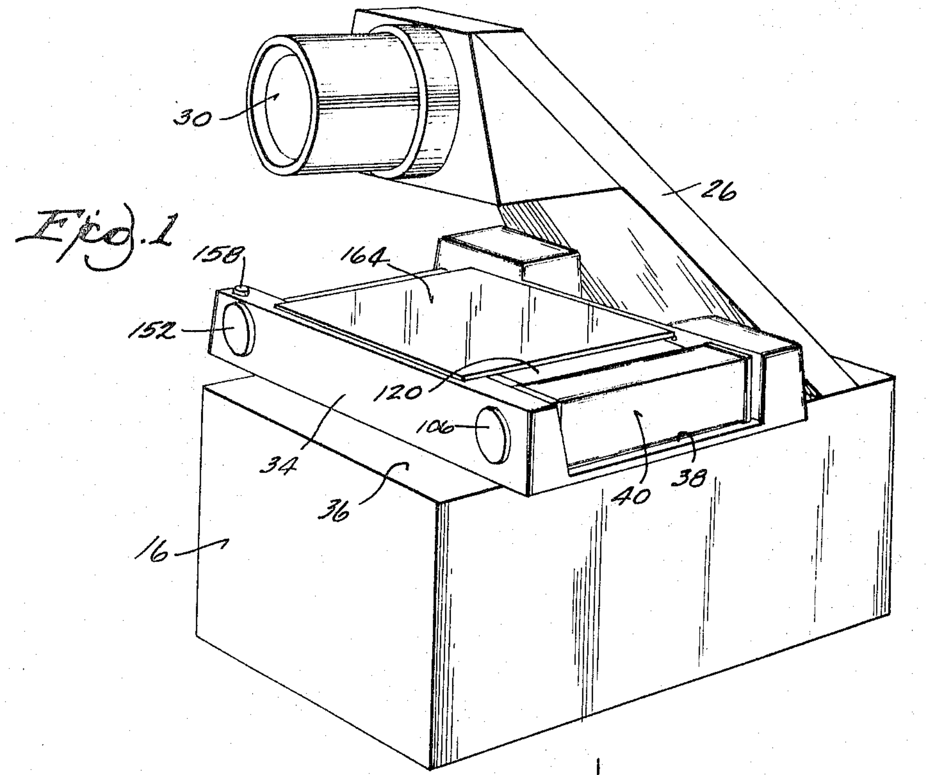
FIG. 1 is a view in perspective showing an overhead projector upon which is mounted accessory apparatus made in accordance with the present invention.
Figure 2:
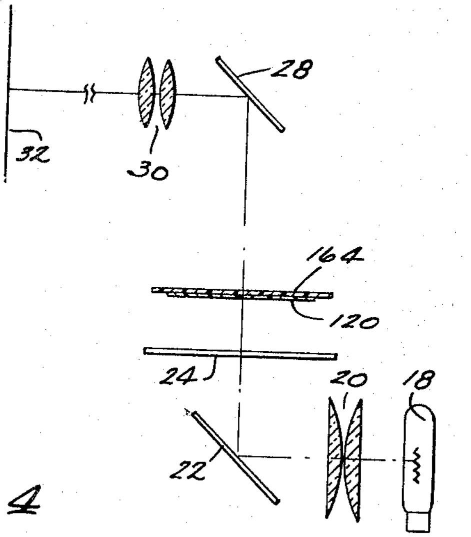
FIG. 2 is a diagrammatic illustration of the optical system embodied in such a projector.
Figure 3:
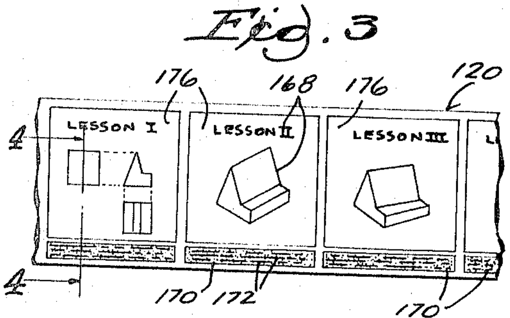
FIG. 3 is a plan view of a film strip made in accordance with the invention, a number of consecutive image-bearing areas being shown, along with separate prompting areas for each.

The conventional overhead projector which is illustrated in FIGS. 1 and 2 comprises a base 16 containing a light source 18, condensing lens 20, mirror 22, and Fresnel lens 24.

Arm 26 extends above the stage 36 which supports the transparency to be projected. The arm carries another mirror at 28 and a projecting lens 30. In practice the image is enlarged about ten times as projected onto a screen 32.

The equipment contemplated by the present invention includes a frame or casing 34 which spans the stage 36 and is provided at 38 (FIG. 7) with a pocket for a cartridge 40. The cartridge includes a pair of heads 42 and 44, preferably of non-circular cross section fitted to the recess 38, the heads being connected by a housing 46. The ends 48 and 50 of the housing are spaced as clearly shown in FIGS. 12 and 13 and inset to provide a recess at 52 in the upper corner of the housing.

Figures 9, 11:
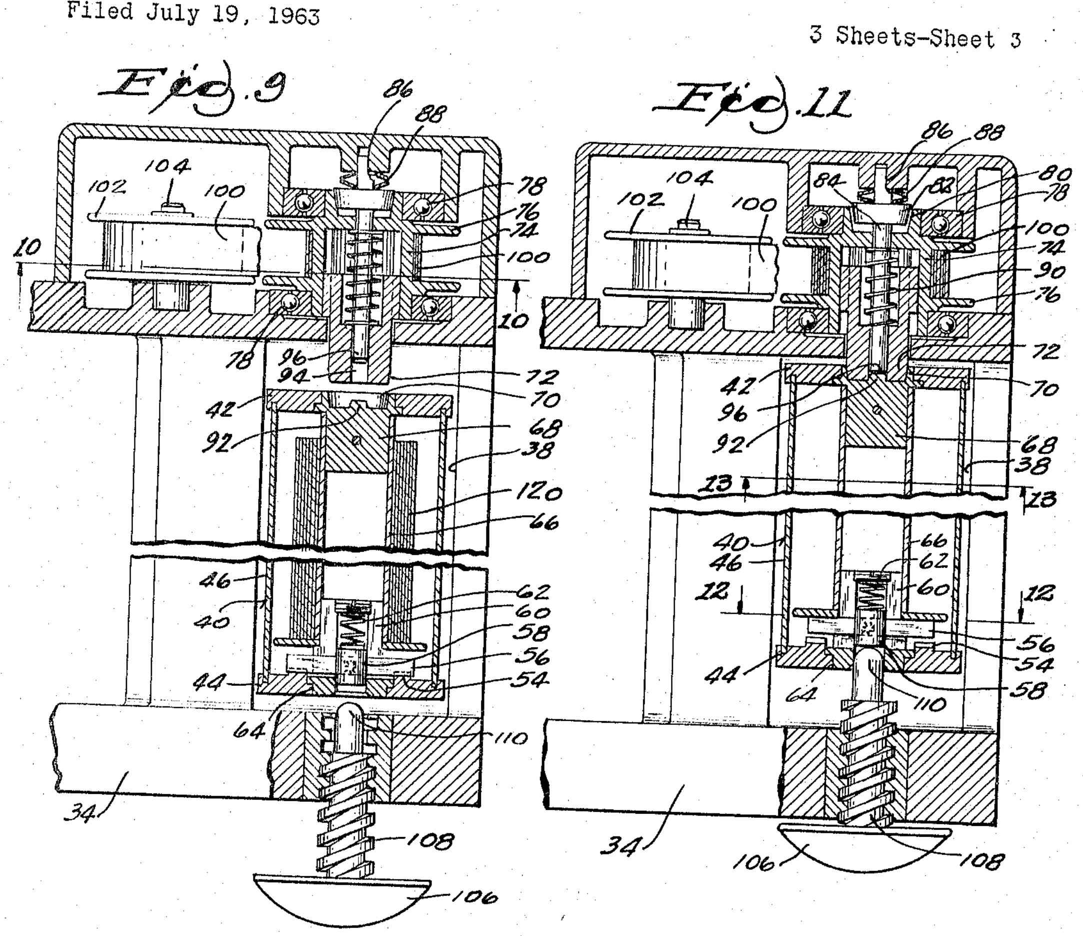
FIG. 9 is a fragmentary detail view largely in horizontal section through a portion of the auxiliary stage in which the rewind mechanism and the film mechanism are incorporated, the mechanism being shown in disconnected position.
FIG. 11 is a view similar to FIG. 9 showing parts in modified positions which they assume when the mechanism is in position for use.

The head 44 of the housing is interiorly provided with brake ribs or teeth at 54 normally engaged as shown in FIG. 9 by a transverse key 56 on the spindle 58 which is axially biased in the tubular shaft 60 by means of compression spring 62 within the shaft. Shaft 60 has a bearing 64 in the head 44 so that, but for the engagement of the key 56 with the teeth 54, the tubular spindle 66 would be rotatable within the housing 46.

The opposite end of spindle 66 is carried by a shaft section 68 rotatable in the head 42 of the housing and provided at its end with a tapered clutch socket 70.

With the parts in the positions shown in FIG. 9 the spindle is locked in the cartridge and the cartridge is freely movably into and removably from the recess provided at 38 in the casing 34.

Aligned with the clutch recess 70, at the far side of casing 34, as viewed in FIGS. 9 and 11, is a male clutch member 72 which is complementary to socket 70 and is splined within the hub 74 of a reel 76 rotatably mounted in bearings 78 provided by the casing 34. This hub has another female clutch socket at 80 normally engaged with a male clutch member 82 carried on a non-rotatable rod 84 which has a flat side 86 engaged with a complementary surface of casing 34 to preclude it from rotation. Belleville springs 88 bias the rod 84 toward a position in which the male clutch element 82 is engaged with the complementary socket 80 so that the reel 74 is normally secured against rotation when the parts are as viewed in FIG. 9. Encircling the rod 84 is a compression spring 90 which is seated against the hub 74 of reel 76 and biases the shaft section 72 out of the hub as shown in FIG. 9.

The socket 70 of the shaft section 68 has a central stud 92 receivable into the bore 94 in which rod 84 is reciprocable. In the position of the parts shown in FIG. 11, the stud 92 engages the end 96 of rod 84 to displace the rod against the bias of spring 90 and thereby to disengage the male clutch element 82 from the complementary socket 80, thus freeing the reel 76 for rotation.

Figure 10:
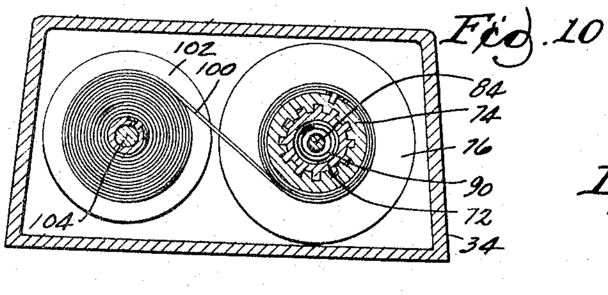
FIG. 10 is a detail view taken in section on line 10—10 of FIG. 9.

The clock spring 100, which is partially wound on the reel 76, is wound in the opposite direction about reel 102, as clearly appears in FIG. 10. The reel 102 rotates on a post 104 fixed in casing 34.

The arrangement of the two reels 76 and 102 with the spring 100 wound in opposite directions around them is known as a negator motor. It is a device which exerts a reasonably constant torque on the reel 74 in a direction tending to cause the spring to wind itself on reel 74, simultaneously unwinding itself from reel 102. This negator motor functions like a constantly energized constant torque electric motor and is used to rewind on spindle 66 film withdrawn therefrom for projection.

When the operator deposits a cartridge 40 in the recess 38 as shown in FIG. 9, he manipulates the head 106 of the fast acting screw 108 to advance the screw from the position of FIG. 9 to the position of FIG. 11, thereby causing its rounded extremity 110 to displace the spindle 66 bodily within the housing 46 to disengage the key 56 from the teeth 54. This permits rotation of spindle 66.

However, the same movement which frees the spindle for rotation clutches the shaft section 68 thereof with the male clutch element 72, splined to the spring actuated reel 76. This also displaces the rod 96 to release the clutch element 82 from the hub socket 80 of reel 76 thereby freeing the reel for rotation subject to the bias of its spring 100. Thus the torque developed by spring 100 is immediately communicated to the film storage spindle 66 in a film winding direction.

Figure 12:
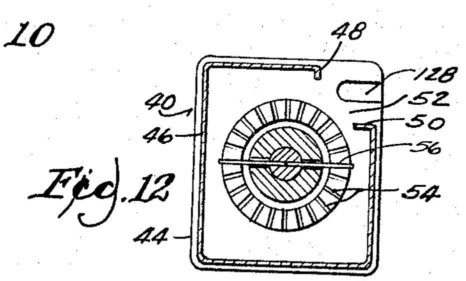
FIG. 12 is a view taken in section on line 12—12 of FIG. 11.
Figure 14:
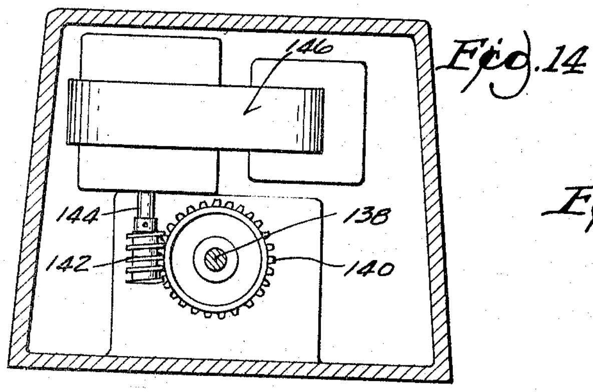
FIG. 14 is a view on an enlarged scale taken in section on the line 14—14 of FIG. 6.
Figure 13:
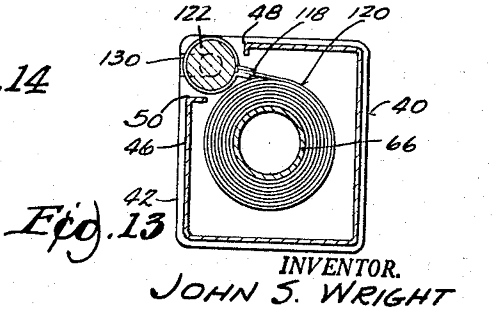
FIG. 13 is a view taken in section on line 13—13 of FIG. 11.

The free end 118 of the film strip 120 wound on the spool 66 is engaged with a winding spindle 122 which, in the position of the parts shown in FIG. 13, is disposed in the recess 52 of the cartridge. Winding spindle 122 has reduced ends 124 and 126 which are respectively engaged in the slots 128 and 130 with which the cartridge casing heads 44 and 42 are respectively provided as shown in FIGS. 12 and 13. When the operator grasps the spindle 122 (and the enveloping end 118 of the film strip 120) to pull the film strip across the guide rolls 132, 134 (FIGS. 6 and 7), he is acting against the relatively constant torque of spring 100. The operator finally manipulates the spindle 122 to engage the reduced end 124 thereof with the terminal chuck portion 136 of drive shaft 138. This shaft is mounted in appropriate bearings and rotatably carries a worm gear 140 driven by worm 142 on the armature shaft 144 of motor 146 (FIGS. 6 and 14). The worm gear 140 is free of the shaft and drives it only when the clutch collar 141 pinned to the shaft is frictionally engaged with the face of gear 140 by the bias of spring 160 exerted on the shaft by manipulation of hand wheel 152 as will now be described.

The film winding spindle 122 is held thus engaged with the motor driven chuck 136 by engagement of the reduced extremity 126 at the other end of spindle 122 in a bearing socket provided at 148 in the fixed tube 150. Tube 150 has a cam slot 154. Rotatable in tube 150 is a rod 151 carrying hand wheel 152 and also having a laterally projecting pin 156 engaged in slot 154. Rotation of hand wheel 152 advances rod 151 and compresses spring 160 to cause button 161 to push spindle 122 into clutching engagement with motor-driven chuck 138.

In the position of parts shown in FIGS. 6 and 7, the film strip 120 is tensioned across rollers 132 and 134 by reason of the fact that the spindle 122 is clutched to the shaft 138 with which the motor has an irreversible driving connection. A push button switch 158 located conveniently for the operator permits him to energize motor 146 to rotate shaft spindle 122 at will, to draw an additional length of film from the cartridge. Reverse operation of the hand wheel 152 will relieve spindle 122 of the pressure of spring 160 and thus eliminate or reduce the friction between clutch member 141 and gear 140 so that the film strip can be rewound on the storage spindle 66 by the torque of the negator motor above described.

A transparent sheet of plastic or glass 164 is preferably hinged at 166 to the casing 34. It is desirably spaced slightly above the film strip 120 to avoid frictional drag thereagainst. The sheet 164 is a scribable surface for grease pencil markings, etc., which are projected concurrently with the film image. Accordingly, the film need not be marked upon.

Figure 4:
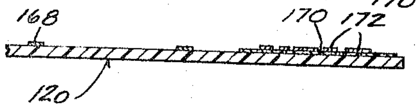
FIG. 4 is an enlarged detail view taken in section on the line 4—4 of FIG. 3.

As best shown in FIG. 4, the images 168 carried by the film 120 are on the surface thereof. Also desirably on the surface of the film strip is a strip 170 printed thereon with so-called opaque ink rather than the transparent ink used to make the images 168 if these are printed. The prompting notes are represented by the ink deposits shown at 172 in FIG. 4. These are applied to either face of the film strip but normally are applied onto the opaque deposits 170. The prompting note deposits 172 preferably comprise transparent ink preferably in color. While the area 170 reserved for prompting has been described as made by deposits of pigment such as that of opaque ink, the ink used does not render the area opaque in fact but merely translucent, rather than transparent. It looks entirely black beside the image projected on the screen. This is true regardless of the color of the opaque ink used to black out the areas at 170. However, sufficient light penetrates the opaque backing 170 so that the prompting messages printed at 172 on either face of the film strip are illuminated brillantly and are clearly conspicuously visible to the lecturer. No explanation is known as to why these messages are so conspicuous to a lecturer and yet do not appear in the projected image. Apparently it is a matter of relative brilliance.

Figure 5:
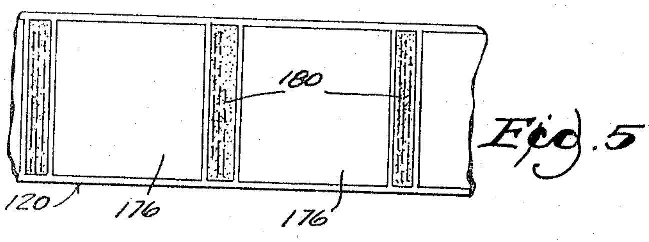
FIG. 5 shows a modified embodiment with a different arrangement of the prompting areas in relation to the image-bearing areas.

As shown in FIG. 5, it is not necessary that the prompting area 170 be located along one margin of the film strip 120. It may intervene between picture area 176 as shown at 180.

As already indicated, apparatus embodying the present invention may be used on practically any overhead projector. The frame 34 provides its own stage when simply laid on the stage 36 of any conventional projector. The cartridge 40 is laid into the pocket 38. The knob 106 is used to advance the fast-acting screw 108, to displace the storage spindle within the cartridge, thereby freeing it for rotation but first connecting it with the spring actuated reel 76 and releasing the reel so that the torque thereof, responsive to the bias of spring 100, can be imposed on the spool.

The operator will then lift the glass plate 164 and grasp the winding spindle 122, using this to manipulate the end 118 of the film strip over the rollers 132 and 134. The spindle 122 is thereupon engaged with the motor driven chuck 136 at one end and is held so engaged by manipulating the cam tube 150 into bearing engagement with the other end of the spindle. The glass plate 164 is then set over the film strip 100. Manipulation of the motor controlled switch button 158 winds the film strip onto the spindle 122 to register successive image areas 176 with the stage for the brilliant projection of their respective images through the lens 30 onto the screen 32.

The operator can use a grease pencil or equivalent, marking device, or a pointer, to designate any parts of the projected image to which he wishes to direct the particular attention of his audience. When he has finished his demonstration, he may reversely rotate the cam tube 150 to release the winding spindle from the motor driven chuck, whereupon the film strip will be rewound onto the storage spindle within the cartridge. When the fast acting screw 106 is then rotated counterclockwise to withdraw it from the position of FIG. 11 to that of FIG. 9, the reel 76 is first re-engaged by clutch member 82 to hold the remaining energy stored in spring 100. The film storage spindle 66 is then disengaged from the reel shaft 72 and finally the spindle 66 is re-engaged with the end 44 of the cartridge and thereby locked against relative rotation. At the conclusion of these operations, the cartridge is entirely free and may be picked up freely from the recess 38 of casing 34.

By reason of the foregoing structures, the film 120 remains tightly wound in the cartridge 40, even after removal from the projector. Key 56 holds the film from unwinding and maintains the film tensioned between the key anchored spindle 66 and the spindle 122 which is retained against inward movement by its engagement in slots 128 of the cartridge end heads 44. Accordingly, when returned to the projector after storage or transport, the film 120 is pretensioned for its next showing and no unwanted slack wil be present in the film. This is important because to maintain all parts of the image in focus during projections, the film 120 must be tensioned flat in the span between guide rollers 132, 134. If there were no provisions for maintaining tension in the film while it is out of the projector, the natural resilience of the wound film would tend to unroll it to a considerable extent with the result that the first few frames might sag during projections and be unusable. This cannot happen in the device of this invention.

I claim:

1. A supplemental projector stage adapted to be interposed between a projector light source and lens for supporting image-bearing film for projection, said stage comprising a frame having a central window, a film winding spindle mounted on the frame at one side of the window, a removable film cartridge having a film storage spindle, means for releasably mounting the cartridge on the frame at the other side of the window from the winding spindle, means for subjecting the storage spindle of the cartridge to torque tending to rewind the film thereon, said last means comprising a negator spring motor developing approximately constant torque over a wide range of film movement, means for mounting said motor on the frame independently of said cartridge, and a driving coupling having separable parts respectively connected with the storage spindle and with the motor, said cartridge and storage spindle being freely removable unitarily.

2. A supplemental projector stage adapted to be interposed between a projector light source and lens for supporting image-bearing film for projection, said stage comprising the combination with a frame having a window and further having selectively operable film winding means at one side of said window and a film cartridge pocket at the other, of a cartridge removably disposed in the pocket and free of connection with the frame and having an axially displaceable storage spindle wound with film which bears matter to be projected, a winding spindle at the side of the frame opposite the pocket and having means for connection with the winding means to be actuated thereby to wind film on the spindle; rewinding means on said frame adjacent the pocket and detachably engaged with said storage spindle for the rotation thereof, the rewinding means and the storage spindle having complementary clutch elements engageable and disengageable by axial displacement of the storage spindle, means on said frame for effecting axial movement of the storage spindle for engaging and disengaging said clutch elements, and mechanism for subjecting the rewinding means to torque in a direction to rotate said storage spindle in a film rewinding direction, said rewinding means including means for exerting through said clutch elements upon said storage spindle less torque in a rewinding direction than is exerted on the storage spindle by said film when the winding spindle is actuated by said winding means.

3. A projector stage according to claim 2 in which the rewinding means includes a torque storing spring motor, and said spring motor includes a driving part connected with one of said clutch elements, said spring motor further being provided with releasable brake means normally engaged for maintaining said part subject to the torque energy stored in the motor, and means whereby relative movement for engaging said clutch elements is transmitted and applied to release said brake means.

4. A projector stage according to claim 2 in which the cartridge includes a recess in which the winding spindle is normally disposed, the film being connected with the winding spindle.

5. A projector stage according to claim 2 in which the rewinding means and the said storage spindle have normally disengaged complementary clutch elements, the rewinding means and said frame having complementary brake elements normally engaged, spring means acting on said rewinding means for exerting torque through the engaged clutch elements when said brake elements are disengaged, and means for engaging the clutch elements and thereupon disengaging said brake elements.

6. A projector stage according to claim 5 in which the cartridge and the said storage spindle have complementary brake elements normally engaged, the means last mentioned also including means for disengaging the brake elements of the cartridge and storage spindle.

7. A projector stage comprising the combination of a frame having a film cartridge pocket, a film rewind motor with a first clutch element at said pocket, a window, a cartridge removably positioned in the pocket and having a rotatable film storage spindle with a second clutch element aligned with the first clutch element and normally disengaged therefrom, normally engaged first and second brake elements respectively connected with the film storage spindle and the cartridge, said clutch elements being engageable and said brake elements being disengageable upon relative axial movement of said storage spindle, and means for effecting such axial movement for connecting the storage spindle with the rewind motor and for freeing the storage spindle for rotation respecting the cartridge.

8. A projector stage according to claim 7 in which the motor comprises means for constantly exerting torque, said motor and frame having complementary and normally engaged third and fourth brake elements constituting means for restraining said first clutch element against rotation, and means for communicating motion from the storage spindle during axial movement thereof for disengaging the third and fourth brake elements whereby the torque of said motor is effective on said film storage spindle when the storage spindle is free for rotation respecting the cartridge.

9. A projector stage according to claim 6 in which film wound on said storage spindle has a free end with a winding spindle connected to it and said frame carries a film winding means, the winding spindle and winding means having third and fourth clutch elements releasably engaged.

10. A projector stage according to claim 9 in which the winding means comprises a motor with a manually operable control and irreversible driving connection to said fourth clutch element.

References Cited by the Examiner

UNITED STATES PATENTS

| | | | |
|---|---|---|---|
| 1,114,223 | 10/1914 | Brown. | |
| 1,257,874 | 2/1918 | Jordan | 242—71.6 |
| 1,347,053 | 7/1920 | Owen | 352—240 |
| 1,376,749 | 5/1921 | Edison | 40—90 |
| 2,022,353 | 11/1935 | Kindelmann et al. | 242—71.2 |
| 2,133,743 | 10/1938 | Githens et al. | 242—55.11 |
| 2,184,331 | 12/1939 | Becker et al. | 242—55.11 |
| 2,326,654 | 8/1943 | Jagust | 242—71.2 |
| 2,550,556 | 4/1951 | Haloski | 242—71.1 X |
| 2,673,694 | 3/1954 | Howell | 242—107.3 |
| 3,090,574 | 5/1963 | Doncaster et al. | 242—55.13 |

FOREIGN PATENTS

| | | |
|---|---|---|
| 18,360 | 1913 | Great Britain. |

FRANK J. COHEN, *Primary Examiner*.

JULIA E. COINER, GEORGE F. MAUTZ, *Examiners*.